US009950946B2

(12) United States Patent
Dogimont et al.

(10) Patent No.: US 9,950,946 B2
(45) Date of Patent: Apr. 24, 2018

(54) GLASS SHEET HAVING HIGH TRANSMISSION OF INFRARED RADIATION

(71) Applicants: AGC GLASS EUROPE, Louvain-la-Neuve (BE); ASAHI GLASS CO LTD, Chiyoda Ku (JP)

(72) Inventors: Audrey Dogimont, Sart-Dames-Avelines (BE); Thomas Lambricht, Perwez (BE)

(73) Assignees: AGC GLASS EUROPE, Louvain-la-Neuve (BE); ASAHI GLASS CO LTD, Chiyoda Ku (JP)

( * ) Notice: Subject to any disclaimer, the term of this patent is extended or adjusted under 35 U.S.C. 154(b) by 0 days.

(21) Appl. No.: 15/103,678

(22) PCT Filed: Dec. 9, 2014

(86) PCT No.: PCT/EP2014/077046
§ 371 (c)(1),
(2) Date: Jun. 10, 2016

(87) PCT Pub. No.: WO2015/091106
PCT Pub. Date: Jun. 25, 2015

(65) Prior Publication Data
US 2016/0304389 A1 Oct. 20, 2016

(30) Foreign Application Priority Data
Dec. 19, 2013 (EP) ...................... 13198454

(51) Int. Cl.
*C03C 3/087* (2006.01)
*C03C 4/10* (2006.01)

(52) U.S. Cl.
CPC ............... *C03C 3/087* (2013.01); *C03C 4/10* (2013.01)

(58) Field of Classification Search
CPC ............. C03C 3/087; C03C 4/02; C03C 4/10
See application file for complete search history.

(56) References Cited

U.S. PATENT DOCUMENTS 3,466,180 A * 9/1969 Hall .................... C03C 1/10 501/71
4,427,429 A * 1/1984 Tiilikka ................... C03C 1/04 501/32
2007/0161492 A1 7/2007 Smith et al.
2008/0131628 A1 * 6/2008 Abensour .............. C03C 3/087 428/34
2014/0017500 A1 1/2014 Koike et al.
2014/0092052 A1 * 4/2014 Grunthaner ............ G06F 3/044 345/174
2014/0154440 A1 6/2014 Iida et al.

FOREIGN PATENT DOCUMENTS

| DE | 1291597 B | * | 3/1969 | ............... C03C 8/02 |
|---|---|---|---|---|
| GB | 869328 A | * | 5/1961 | ......... C03C 10/0018 |
| GB | 896558 A | * | 5/1962 | ............. C03C 1/105 |
| GB | 925507 A | * | 5/1963 | ............... C03C 1/10 |
| GB | 936944 A | * | 9/1963 | ............... C03C 1/10 |
| GB | 984446 A | * | 2/1965 | ............. C03C 10/00 |
| GB | 995576 A | * | 6/1965 | ............... C03C 4/02 |
| WO | 2012/128180 A1 | | 9/2012 | |
| WO | WO 2012124758 A1 | * | 9/2012 | ............. C03C 3/085 |
| WO | WO 2012128180 A1 | * | 9/2012 | ............. C03C 3/085 |
| WO | 2013/021975 A1 | | 2/2013 | |

OTHER PUBLICATIONS

International Search Report dated Jan. 20, 2015 in PCT/EP2014/077046 Filed Dec. 9, 2014.

* cited by examiner

Primary Examiner — Elizabeth A. Bolden
(74) Attorney, Agent, or Firm — Oblon, McClelland, Maier & Neustadt, L.L.P.

(57) ABSTRACT

The invention relates to a glass sheet having high transmission of infrared (IR) radiation. More specifically, the invention relates to a glass sheet having a composition which comprises, in a content expressed as percentages by total weight of glass: $SiO_2$ 55-85%; $Al_2O_3$ 0-30%; $B_2O_3$ 0-20%; $Na_2O$ 0-25%; CaO 0-20%; MgO 0-15%; $K_2O$ 0-20%; BaO 0-20%; Total iron (expressed in the form of $Fe_2O_3$) 0.002-0.06%, a chromium content (expressed in the form of $Cr_2O_3$) ranging from 0.0015% to 1% and a cobalt content (expressed in the form of Co) ranging from 0.0001% to 1%. By virtue of its high transmission of IR radiation, the glass sheet according to the invention can advantageously be used in a device using a technology requiring very good transmission of IR radiation, whether through the main faces or starting from their sheared edge (for example, a screen or panel or pad, the glass sheet defining a touch surface). The invention thus also relates to the use of such a glass sheet in a device using infrared radiation propagating essentially inside said sheet.

16 Claims, 3 Drawing Sheets (a)

(b)

GLASS SHEET HAVING HIGH TRANSMISSION OF INFRARED RADIATION

1. FIELD OF THE INVENTION

Figure 1:
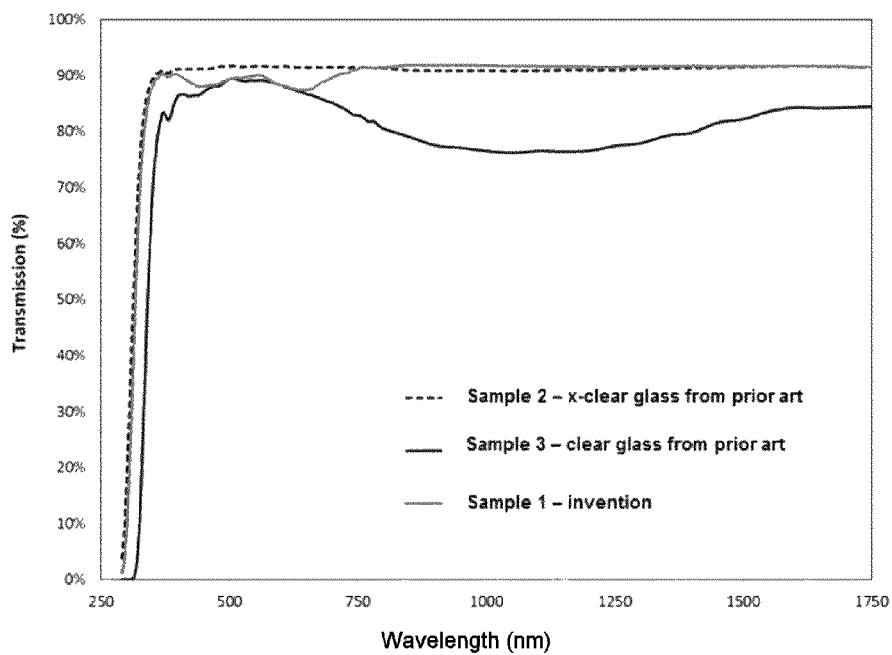
Figure 1:
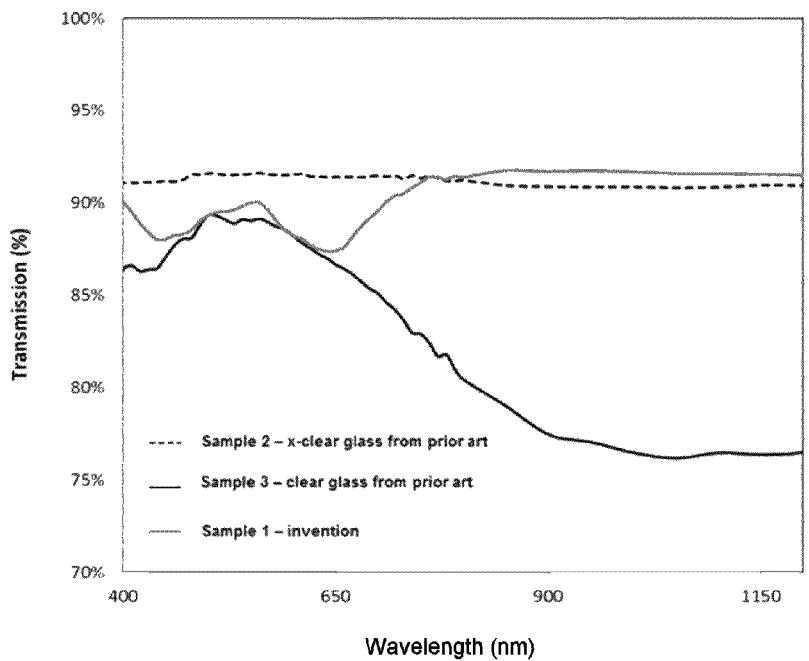

The present invention relates to a glass sheet exhibiting high transmission of infrared radiation.

The glass sheet according to the invention can thus be advantageously used in any device requiring panels more or less large in size and using a technology requiring very good transmission of infrared radiation through said panels, whether through the main faces or starting from their sheared edge.

For example, the glass sheet according to the invention can advantageously be used in a touchscreen or touch panel or touchpad using the optical technology referred to as Planar Scatter Detection (PSD) or also Frustrated Total Internal Reflection (FTIR) (or any other technology using IR radiation in the sheared edge of the glass) in order to detect the position of one or more objects (for example, a finger or a stylus) on the surface of said sheet. The invention consequently also relates to the use of such a glass sheet in a device using infrared radiation propagating essentially inside said sheet.

Finally, the invention also relates to a touchscreen, a touch panel or a touchpad comprising such a glass sheet.

2. SOLUTIONS OF THE PRIOR ART

The PSD and FTIR technologies make it possible to obtain multiple-detection touchscreens/touch panels which are inexpensive and which can have a relatively high touch surface (for example, from 3 to 100 inches) while being thin.

These two technologies involve:
(i) the injection of infrared (IR) radiation, for example by virtue of LEDs, into a substrate transparent to infrared radiation starting from one or more edges/sheared edges;
(ii) the propagation of the infrared radiation inside said substrate (which then acts as waveguide) via an optical phenomenon of total internal reflection (no radiation "exits" the substrate);
(iii) the contact of the surface of the substrate with any object (for example a finger or a stylus), resulting in a local perturbation by scattering of the radiation in all directions; some of the deflected rays will thus be able "to exit" the substrate.

In the FTIR technology, the deflected rays form an infrared light spot on the lower surface of the substrate, opposite the touch surface. These are seen by a special camera located below the device.

The PSD technology for its part involves two additional stages subsequent to stages (i)-(iii):
(iv) the analysis by a detector of the resulting IR radiation at the edge of the substrate; and
(v) the calculation by algorithms, starting from the radiation detected, of the position(s) of the object(s) in contact with the surface. This technology is set out in particular in the document US2013021300A1.

Basically, glass is a material of choice for touch panels as a result of its mechanical properties, its durability, its resistance to scratching and its optical clarity and because it can be chemically or thermally strengthened.

In the case of glass panels used for the PSD or FTIR technology and with a very large surface and thus with a relatively great length/width, the IR radiation injected has a long optical path length. In this case, the absorption of the IR radiation by the material of the glass thus significantly influences the sensitivity of the touch panel, which may then undesirably decrease in the length/width of the panel. In the case of glass panels used for the PSD or FTIR technology and with a smaller surface and thus with a shorter optical path length of the IR radiation injected, the absorption of the IR radiation by the material of the glass also has an influence, in particular on the energy consumption of the device incorporating the glass panel.

Thus, a glass sheet highly transparent to infrared radiation is very useful in this context, in order to guarantee an intact or sufficient sensitivity over the entire touch surface when this surface is large. In particular, a glass sheet with a coefficient of absorption in the range of wavelengths from 780 to 1200 nm, generally used in these technologies, equal to or even less than 1 $m^{-1}$ is ideal.

Furthermore, a glass sheet highly transparent to infrared radiation, transparent in the visible region or slightly to strongly colored, indeed even opaque, also proves to be very useful in other devices requiring panels more or less large in size and using a technology requiring very good transmission of infrared radiation through said panels, whether through the main faces (the optical path length then corresponds to the thickness of the sheet) or starting from their sheared edge.

In order to obtain high transmission in the infrared region (and in the visible region), it is known to reduce the total content of iron in the glass (expressed in terms of $Fe_2O_3$, according to the standard practice in the field), obtaining low-iron glasses. Glasses of silicates type always comprise iron as the latter is present as an impurity in the majority of the starting materials used (sand, limestone, dolomite, and the like). Iron exists in the structure of glass in the form of ferric $Fe^{3+}$ ions and ferrous $Fe^{2+}$ ions. The presence of ferric $Fe^{3+}$ ions confers, on the glass, a slight absorption of low-wavelength visible light and a stronger absorption in the near ultraviolet region (absorption band centered on 380 nm), while the presence of ferrous $Fe^{2+}$ ions (sometimes expressed as oxide FeO) results in a strong absorption in the near infrared region (broad absorption band centered on 1050 nm). Thus, the increase in the total iron content (in both its forms) accentuates the absorption in the visible region and in the infrared region. Furthermore, a high concentration of ferrous $Fe^{2+}$ ions results in a decrease in the transmission in the infrared region (in particular, the near infrared region). However, to achieve a coefficient of absorption in the range of wavelengths from 780 to 1200 nm which is sufficiently low for the touch applications by influencing only the total iron content would require such a great decrease in this total iron content that either (i) this would result in production costs which are much too high, due to the need for very pure starting materials (which sometimes even do not exist sufficiently pure), or (ii) this would present production problems (in particular the premature wear of the furnace and/or difficulties of heating the glass in the furnace).

It is also known, in order to further increase the transmission of the glass, to oxidize the iron present in the glass, that is to say to reduce the content of ferrous ions in favor of the content of ferric ions. The degree of oxidation of a glass is given by its redox, defined as the ratio by weight of $Fe^{2+}$ atoms with respect to the total weight of the iron atoms present in the glass, $Fe^{2+}$/total Fe.

In order to reduce the redox of the glass, it is known to add an oxidizing component to the batch of starting materials. However, the majority of the known oxidants (sulfates, nitrates, and the like) have an oxidizing power which is not sufficiently strong to achieve the IR transmission values desired in particular for the touch panels application using the FTIR or PSD technology or have to be added in an excessively large amount with collateral disadvantages, such as cost, incompatibility with the production process, and the like.

Moreover, in order to obtain a glass sheet which is more or less intensely colored, indeed even opaque, the virtually universal solution is to use a glass composition based on iron in relatively large amounts, iron being a very effective and inexpensive colorant.

3. OBJECTIVES OF THE INVENTION

The objective of the invention, in at least one of its embodiments, is to provide a glass sheet with a high transmission of infrared radiation. In particular, it is an objective of the invention to provide a glass sheet with a high transmission of near infrared radiation, in particular in the range of wavelengths from 780 to 1200 nm.

Another objective of the invention, in at least one of its embodiments, is to provide a glass sheet with an attractiveness/color/opacity suitable for the application chosen and/or market demand, while having a very good transmission of infrared radiation.

Another objective of the invention, in at least one of its embodiments, is to provide a glass sheet which is especially particularly enhanceable in value in a device using infrared radiation propagating essentially inside said sheet.

Another objective of the invention, in at least one of its embodiments, is to provide a glass sheet which, when it is used as touch surface in large-sized touchscreens, touch panels or touchpads, results in no or little loss in sensitivity of the touch function.

Another objective of the invention, in at least one of its embodiments, is to provide a glass sheet which, when it is used as touch surface in touchscreens, touch panels or touchpads of more modest sizes, is favorable to the energy consumption of the device.

Finally, another objective of the invention is to provide a glass sheet with a high transmission of infrared radiation which is inexpensive to produce.

4. ACCOUNT OF THE INVENTION

The invention relates to a glass sheet having a composition which comprises, in a content expressed as percentages by total weight of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20% |
| Total iron (expressed in the form of $Fe_2O_3$) | 0.002-0.06%. |

The composition additionally comprises, by weight with respect to the total weight of the glass, a chromium content (expressed in the form of $Cr_2O_3$) ranging from 0.0015% to 1% and a cobalt content (expressed in the form of Co) ranging from 0.0001% to 1%.

Thus, the invention is based on an entirely novel and inventive approach as it makes it possible to solve the technical problem posed. This is because the inventors have demonstrated that it is possible, by combining, in a glass composition, a low content of iron, chromium and cobalt, within specific ranges of contents, to easily regulate the attractiveness, the color, the transparency in the visible region/the opacity of the glass sheet as a function of the application targeted and/or market demand but while surprisingly and significantly improving its transparency in the IR region, in particular in the range of wavelengths from 780 to 1200 nm. The inventors have thus discovered that it is possible in particular, by combining, in a glass composition, a low content of iron, chromium and cobalt within certain ranges of contents, to obtain a glass which is highly transmitting of IR radiation, highly transparent in the visible region and with a "neutral" color esthetically in very great demand in many applications. In other ranges of contents of chromium and cobalt, the inventors have also discovered that it is also possible to obtain a colored, indeed even opaque, glass, which thus transmits only slightly or not at all in the visible region (in great demand for other applications), while obtaining a high transmission of IR radiation. This last approach is surprising in the field of colored glasses, for which a high selectivity (LT/ET) is generally desired.

Throughout the present text, when a range is indicated, the extremities are included. In addition, all the integral and subdomain values in a numerical range are expressly included as if explicitly written. Also throughout the present text, the values of content are as percentages by weight, that is to say expressed with respect to the total weight of the glass, unless explicitly specified otherwise (for example, in ppm).

Figure 2:
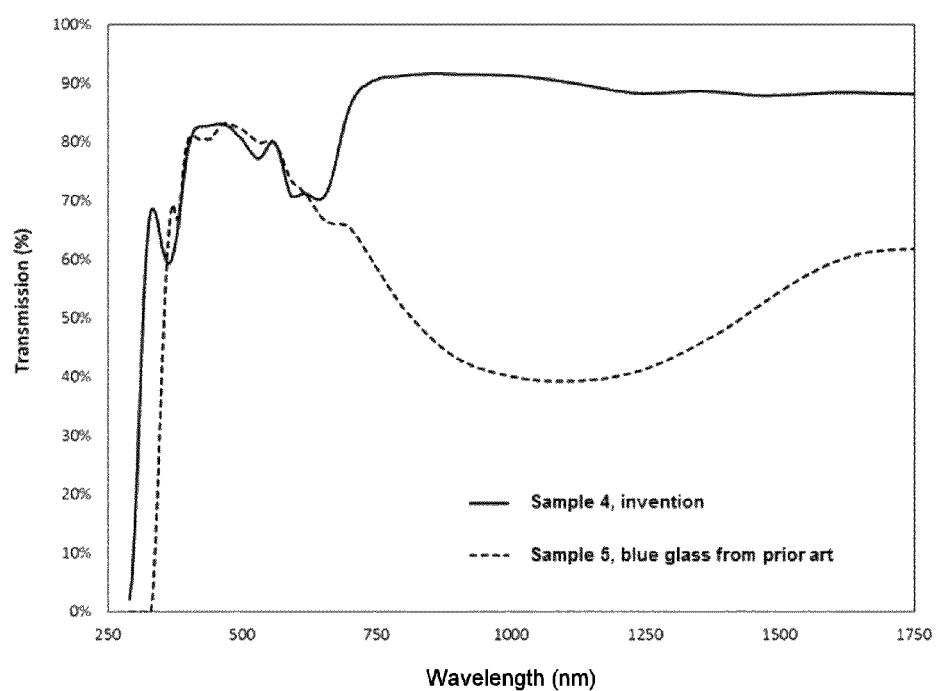
Figure 3:
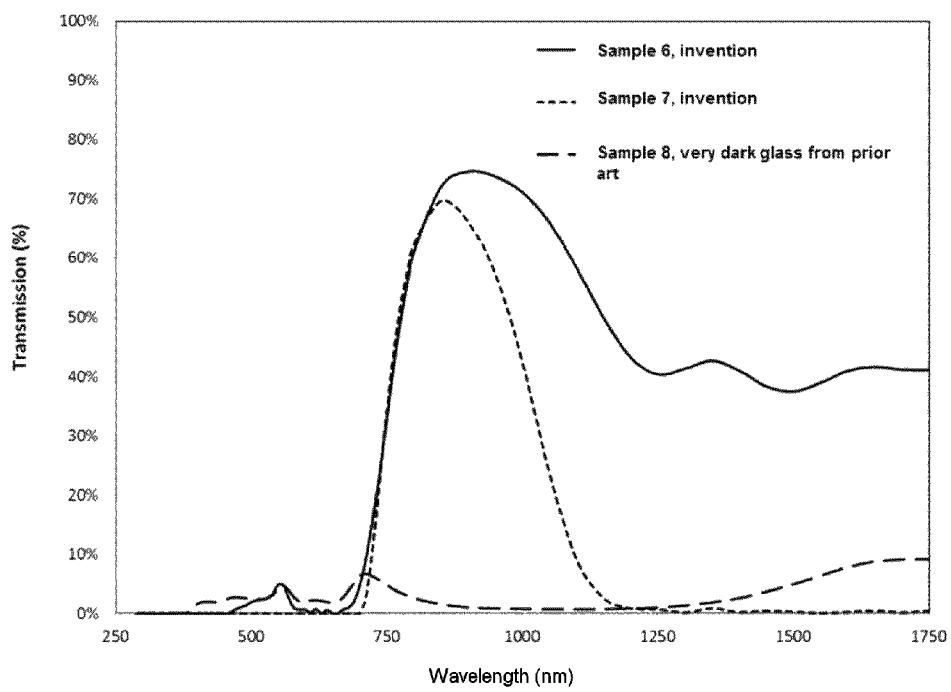

Other characteristics and advantages of the invention will become more clearly apparent on reading the following description and the figures, given as illustrative and non-limiting examples, among which:

FIGS. 1 to 3 represent the effect of the combination of chromium and cobalt, within ranges according to the invention, on the transmission in a glass composition having a low iron content, in comparison with glasses of the state of the art which are similar from an appearance/color viewpoint.

The glass sheet according to the invention is made of glass which can belong to various categories. The glass can thus be a glass of soda-lime-silica, aluminosilicate or borosilicate type, and the like. Preferably, the composition of the glass sheet comprises, in a content expressed as percentages by total weight of glass:

| | |
|---|---|
| $SiO_2$ | 55-78% |
| $Al_2O_3$ | 0-18% |
| $B_2O_3$ | 0-18% |
| $Na_2O$ | 0-20% |
| CaO | 0-15% |
| MgO | 0-10% |
| $K_2O$ | 0-10% |
| BaO | 0-5% |
| Total iron (expressed in the form of $Fe_2O_3$) | 0.002-0.06%. |

More preferably and for reasons of lower production costs, the glass sheet according to the invention is a sheet of soda-lime-silica glass. Advantageously, according to this embodiment, the composition of the glass sheet can comprise, in a content expressed as percentages by total weight of glass:

| | |
|---|---|
| $SiO_2$ | 60-75% |
| $Al_2O_3$ | 0-6% |
| $B_2O_3$ | 0-4% |
| CaO | 0-15% |

| | |
|---|---|
| MgO | 0-10% |
| Na₂O | 5-20% |
| K₂O | 0-10% |
| BaO | 0-5% |
| Total iron (expressed in the form of Fe$_2$O$_3$) | 0.002-0.06%. |

The term "glass", within the meaning of the invention, is understood to mean a completely amorphous material, thus excluding any crystalline material, even partially crystalline material (such as, for example, glass-crystalline or glass-ceramic materials).

The glass sheet according to the invention can be a glass sheet obtained by a floating process, a drawing process, a rolling process or any other process known to manufacture a glass sheet starting from a molten glass composition. According to a preferred embodiment according to the invention, the glass sheet is a float glass sheet. The term "float glass sheet" is understood to mean a glass sheet formed by the float glass process, which consists in pouring the molten glass onto a bath of molten tin, under reducing conditions. A float glass sheet comprises, in a known way, a "tin face", that is to say a face enriched in tin in the body of the glass close to the surface of the sheet. The term "enrichment in tin" is understood to mean an increase in the concentration of tin with respect to the composition of the glass at the core, which may or may not be substantially zero (devoid of tin).

The glass sheet according to the invention can have varied and relatively large sizes. It can, for example, have sizes ranging up to 3.21 m×6 m or 3.21 m×5.50 m or 3.21 m×5.10 m or 3.21 m×4.50 m ("PLF" glass sheet) or also, for example, 3.21 m×2.55 m or 3.21 m×2.25 m ("DLF" glass sheet).

The glass sheet according to the invention can have a thickness varying between 0.1 and 25 mm. Advantageously, in the case of the touch panels application, the glass sheet according to the invention can have a thickness varying between 0.1 and 6 mm. Preferably, in the case of the touchscreens application, for reasons of weight, the thickness of the glass sheet according to the invention is from 0.1 to 2.2 mm. Alternatively, preferably, for any application other than the screen application, essentially for reasons of mechanical strength, the thickness of the glass sheet according to the invention is from 4 to 12 mm.

According to the invention, the composition of the invention comprises a total iron (expressed in terms of Fe$_2$O$_3$) content ranging from 0.002% to 0.06% by weight, with respect to the total weight of the glass. A total iron (expressed in the form of Fe$_2$O$_3$) content of less than or equal to 0.06% by weight makes it possible to further increase the IR transmission of the glass sheet. The minimum value makes it possible not to be excessively damaging to the cost of the glass as such low iron values often require expensive, very pure, starting materials or else purification of these. Preferably, the composition comprises a total iron (expressed in the form of Fe$_2$O$_3$) content ranging from 0.002% to 0.04% by weight, with respect to the total weight of the glass. Very preferably, the composition comprises a total iron (expressed in the form of Fe$_2$O$_3$) content ranging from 0.002% to 0.02% by weight, with respect to the total weight of the glass, or better still the composition comprises a total iron (expressed in the form of Fe$_2$O$_3$) content ranging from 0.002% to 0.014% by weight, with respect to the total weight of the glass.

Preferably, according to the invention, the composition comprises an Fe$^{2+}$ content (expressed in the form of FeO) of less than 20 ppm. This range of contents makes it possible to obtain highly satisfactory properties, in particular in terms of transmission of the IR radiation. Preferably, the composition comprises an Fe$^{2+}$ content (expressed in the form of FeO) of less than 10 ppm. Very preferably, the composition comprises an Fe$^{2+}$ content (expressed in the form of FeO) of less than 5 ppm.

According to a particularly advantageous first main embodiment of the invention, the composition comprises a chromium content, expressed as percentage by weight with respect to the total weight of the glass, such that: $Cr_2O_3 \leq (-17*Co)+0.0535$; Co being the cobalt content, expressed as percentage by weight with respect to the total weight of the glass. Such ranges of contents of chromium and cobalt make it possible to guarantee a high transmission in the IR region, a light transmission of greater than 80% being obtained, without significantly impacting the coloration of the glass sheet (color neutral to very slightly colored).

According to this first main embodiment of the invention, the composition preferably comprises a cobalt content such that: $(Cr_2O_3/25) \leq Co \leq (Cr_2O_3/5)$, which has the effect of bringing the appearance of the glass sheet closer to the "neutrality" color viewpoint, while obviously maintaining a high transmission in the IR region and a light transmission of greater than 80%. More preferably still, the composition comprises a cobalt content such that: $(Cr_2O_3/20) \leq Co \leq (Cr_2O_3/10)$, which has the effect of still more bringing the appearance of the glass sheet closer to the "neutrality" color viewpoint.

Alternatively but still according to the particularly advantageous first main embodiment of the invention, the composition preferably comprises a chromium content such that: $Cr_2O_3 \leq (-17*Co)+0.0290$. Such ranges of contents of chromium and cobalt make it possible to guarantee a high transmission in the IR region, a light transmission of greater than 85% being obtained, without significantly impacting the coloration of the glass sheet (color neutral to very slightly colored). Preferably, the composition additionally comprises a cobalt content such that: $(Cr_2O_3/25) \leq Co \leq (Cr_2O_3/5)$, which has the effect of bringing the appearance of the glass sheet closer to the "neutrality" color viewpoint, while obviously maintaining a high transmission in the IR region and a light transmission of greater than 85%. More preferably still, the composition comprises a cobalt content such that: $(Cr_2O_3/20) \leq Co \leq (Cr_2O_3/10)$, which has the effect of still more bringing the appearance of the glass sheet closer to the "neutrality" color viewpoint.

The light transmission in the present description is considered with the illuminant D for a thickness of 4 mm (LTD4) at a solid angle of observation of 2°.

Still according to the first main embodiment of the invention, the composition can exhibit a chromium/total iron ratio such that: $0.05 \leq Cr_2O_3/Fe_2O_3 \leq 1$. According to this first embodiment and preferably, the composition can exhibit a chromium/total iron ratio such that $0.1 < Cr_2O_3/Fe_2O_3 \leq 1$. Such a range of chromium/total iron ratio makes it possible to further improve the transmission in the IR region. Very preferably, the composition can exhibit a chromium/total iron ratio such that $0.15 \leq Cr_2O_3/Fe_2O_3 \leq 1$. Alternatively, the composition can exhibit a chromium/total iron ratio such that $0.1 < Cr_2O_3/Fe_2O_3 \leq 0.5$.

The glass sheet according to the first main embodiment of the invention can advantageously be used in any device requiring panels more or less large in size and using a technology requiring (i) very good transmission of infrared radiation through said panels, whether through the main faces or starting from their sheared edge, and (ii) very good transmission in the visible region, and also a "neutral" coloration.

For example, the glass sheet according to this first main embodiment can advantageously be used in any technology using IR radiation propagating in the sheared edge of the glass. In particular, the sheet according to this first main embodiment can be enhanceable in value in the "Planar Scatter Detection" (PSD) or also "Frustrated Total Internal Reflection" (FTIR) optical technology for detecting the position of one or more objects (for example, a finger or a stylus) on a surface of said sheet.

In view of its good transmission in the visible region and its highly neutral to slightly colored coloration, the glass sheet according to this first main embodiment can advantageously be used as touchscreen or touch panel or touchpad, in particular fitted above a display surface. Thus, the invention also relates to a touchscreen or a touch panel or a touchpad comprising at least one glass sheet according to the first main embodiment of the invention, defining a touch surface. In this case and preferably, the touchscreen or the touch panel or the touchpad advantageously uses the FTIR or PSD optical technology. In particular, in this case, the glass sheet is advantageously fitted above a display surface.

According to a particularly advantageous second main embodiment of the invention, the composition comprises a chromium content, expressed as percentage by weight with respect to the total weight of the glass, such that: $Cr_2O_3 > (-17*Co)+0.0535$; Co being the cobalt content, expressed as percentage by weight with respect to the total weight of the glass. Such ranges of contents of chromium and cobalt make it possible to obtain a glass sheet colored more or less intensively to opaque, with little or no transmission in the visible region, while maintaining high transmission of infrared radiation.

According to this second main embodiment of the invention, the composition preferably comprises a chromium content such that: $Cr_2O_3 \leq 1.5-Co$. More preferably still, the composition comprises a chromium content such that: $Cr_2O_3 \leq 1-Co$. More preferably still, the composition comprises a cobalt content such that: $Co \leq 0.3\%$. These ranges of contents of chromium and cobalt make it possible to control the production costs of the glass sheet (by optimizing the contribution of chromium and cobalt faced with the desired effect), while also making possible access to a whole panel of more or less intense colors up to opacity.

Still according to the second main embodiment of the invention, the glass sheet preferably has a light transmission LTD4 of less than 85%. More preferably, the glass sheet has a light transmission LTD4 of less than 80%, even better still of less than 70% or even of less than 50%. More preferably still, for certain applications requiring opacity or virtual opacity, the glass sheet has a light transmission LTD4 of less than 10%.

A glass sheet according to the second main embodiment of the invention can advantageously be used in any device requiring panels more or less large in size and requiring (i) very good transmission of infrared radiation through said panels, either through the main faces or starting from their sheared edge, and (ii) a specific color or (virtual) opacity in the visible region.

For example, the glass sheet according to the second main embodiment can advantageously be used in any technology using IR radiation propagating in the sheared edge of the glass. In particular, it can be is enhanceable in value in the "Planar Scatter Detection" (PSD) or "Frustrated Total Internal Reflection" (FTIR) optical technology for detecting the position of one or more objects (for example, a finger or a stylus) on a surface of said sheet which, in view of its more or less intense to opaque color, is capable of partially or completely hiding objects/components found behind/under it.

Still as examples, the glass sheet according to the second main embodiment of the invention can also be enhanced in value:

(1) as decorative panel positioned in front of/around radiant heating, hiding (partially or completely) the unattractive side of the heating but allowing the IR radiation to pass and thus making possible a good output from said heating;

(2) as architectural or decorative spandrel glass;

(3) as pointing device on portable computers (commonly known as "touchpad"), sometimes using a technology requiring infrared radiation. In this case, the glass sheet is preferably very dark, indeed even opaque, in color and thus hides the electronic components located under it;

(4) as front face element of furniture and in particular of furniture intended to include remote controllable electrical/electronic appliances, hiding from view the unattractive side of such appliances but allowing the signal emitted by the remote controls to pass. This is because the majority of domestic electrical/electronic appliances (televisions, hi-fis, DVD players, games consoles, and the like) are remote controllable using a housing which emits signals in the near infrared region. However, this remote control system exhibits in particular two disadvantages: (i) the signal is often disrupted by the presence of secondary radiation in the visible region (sun, lights), which render it less sensitive, and (ii) it requires that the appliances be reachable by the IR signal of the remote control and thus these cannot be concealed inside an item of furniture, even if demand is nevertheless proceeding in this direction for esthetic reasons.

According to the invention, whether for the first or the second main embodiment described above, the glass sheet has a high transmission of IR radiation. More specifically, the glass sheet of the present invention has a high transmission of radiation in the near infrared region.

In order to quantify the good transmission of the glass in the infrared region, in the present description, use will be made of the coefficients of absorption at the wavelengths of 1050, 950 and 850 nm, which consequently must be as low as possible in order to obtain good transmission. The coefficient of absorption is defined by the ratio of the absorbance to the length of the optical path traveled by electromagnetic radiation in a given medium. It is expressed in $m^{-1}$. It is thus independent of the thickness of the material but it is a function of the wavelength of the radiation absorbed and of the chemical nature of the material.

In the case of glass, the coefficient of absorption ($\mu$) at a chosen wavelength $\lambda$ can be calculated from a measurement of transmission (T) and from the refractive index n of the material, the values of n, $\rho$ and T being a function of the chosen wavelength $\lambda$:

$$\mu = -\frac{1}{\text{thick}} \cdot \ln\left[\frac{-(1-\rho)^2 + \sqrt{(1-\rho)^4 + 4 \cdot T^2 \cdot \rho^2}}{2 \cdot T \cdot \rho^2}\right]$$

with $\rho = (n-1)^2/(n+1)^2$

According to the first main embodiment of the invention, the glass sheet has a coefficient of absorption at the wavelengths of 1050, 950 and 850 nm which is lower than that of a "clear" glass of the state of the art or even of an "extra-clear" glass of the state of the art.

Advantageously, the glass sheet according to the first main embodiment of the invention has a coefficient of absorption at the wavelength of 1050 nm of less than 5 m$^{-1}$. Preferably, it has a coefficient of absorption at the wavelength of 1050 nm of less than or equal to 2 m$^{-1}$. Very preferably, it has a coefficient of absorption at the wavelength of 1050 nm of less than or equal to 1 m$^{-1}$.

Advantageously again, the glass sheet according to the first main embodiment of the invention has a coefficient of absorption at the wavelength of 950 nm of less than 5 m$^{-1}$. Preferably, it has a coefficient of absorption at the wavelength of 950 nm of less than or equal to 2 m$^{-1}$. Very preferably, it has a coefficient of absorption at the wavelength of 950 nm of less than or equal to 1 m$^{-1}$.

Advantageously again, the glass sheet according to the first main embodiment of the invention has a coefficient of absorption at the wavelength of 850 nm of less than 5 m$^{-1}$. Preferably, it has a coefficient of absorption at the wavelength of 850 nm of less than or equal to 2 m$^{-1}$. Very preferably, it has a coefficient of absorption at the wavelength of 850 nm of less than or equal to 1 m$^{-1}$.

According to the second main embodiment of the invention, the glass sheet has a coefficient of absorption at the wavelengths of 1050, 950 and 850 nm which is significantly lower than that of a glass of the state of the art having an equivalent color and/or light transmission.

The composition of the glass sheet can comprise, in addition to the impurities present in particular in the starting materials, a low proportion of additives (such as agents which help the melting or the refining of the glass) or of components originating from the dissolution of the refractories constituting the melting furnaces.

The glass sheet according to the invention can advantageously be chemically or thermally tempered.

The glass sheet according to the invention can also advantageously be coated with at least one transparent and electrically conducting thin layer. A transparent and conducting thin layer according to the invention can, for example, be a layer based on $SnO_2$:F, $SnO_2$:Sb or ITO (indium tin oxide), ZnO:Al or also ZnO:Ga.

The glass sheet can also be coated with at least one antireflection layer. This is advantageous in particular in the case of use of the glass sheet of the invention as front face of a screen. An antireflection layer according to the invention can, for example, be a layer based on porous silica having a low refractive index or it can be composed of several layers (stack), in particular a stack of layers of dielectric material alternating layers having low and high refractive indexes and terminating in a layer having a low refractive index.

The glass sheet according to the invention can also advantageously be coated with at least one antifingerprint layer. This is advantageous in the case of use of the glass sheet of the invention as touch surface. Such a layer can be combined with a transparent and electrically conducting thin layer deposited on the opposite face. Such a layer can be combined with an antireflection layer deposited on the same face, the antifingerprint layer being on the outside of the stack and thus covering the antireflection layer.

The glass sheet according to the invention can also be treated on at least one of its main faces, for example by frosting with acid or base, so as to generate antifingerprint properties or also antireflection or antiflicker properties. This is also advantageous in particular in the case of use of the glass sheet of the invention as front face of a touch or non-touch screen.

In addition, the invention also relates to a touchscreen or a touch panel or a touchpad comprising at least one glass sheet according to the invention defining a touch surface. According to this embodiment, the touchscreen or the touch panel or the touchpad advantageously uses the FTIR or PSD optical technology. In particular, for a screen, the glass sheet is advantageously fitted above a display surface.

According to the applications and/or properties desired, other layers/other treatments can be deposited/carried out on one and/or the other face of the glass sheet according to the invention.

Finally, the invention also relates to the use of a glass sheet according to the invention in a device using infrared radiation propagating essentially inside said sheet. The two main embodiments of the glass sheet according to the invention and also all their specific embodiments also apply to the use according to the invention as embodiments of the use.

The term "radiation propagating essentially inside the sheet" is understood to mean radiation which travels in the body of the glass sheet between the two main faces of the sheet.

Advantageously, according to a specific embodiment of the use according to the invention, the propagation of the infrared radiation takes place by total internal reflection. According to this embodiment, the infrared radiation can be injected inside the glass sheet starting from one or more edge (s) of said sheet. The term "edge of the sheet" is understood to mean each of the four surfaces defined by the thickness of the sheet and substantially perpendicular to the two main faces of the sheet. Still according to this embodiment, alternatively, the infrared radiation can be injected inside the glass sheet starting from one or both main face (s) with a certain angle.

Particularly advantageously according to the use of the invention, the composition is according to the first main embodiment of the glass sheet according to the invention.

The examples which follow illustrate the invention without the intention of limiting its coverage in any way.

EXAMPLES

Various samples according to the invention were prepared, in the form of 3 sets, with variable amounts of iron, chromium and cobalt.

For the preparation of the samples according to the invention, the starting materials were mixed in the powder form and placed in a crucible for the melting, according to an identical base composition specified in the table below, and to which were added starting materials comprising cobalt, chromium and iron in variable amounts as a function of the contents targeted in the final composition (it should be noted that the iron is already, at least in part, present in the starting materials of the base composition as impurity).

| Base composition | Content [% by weight] |
| --- | --- |
| $SiO_2$ | 71.71 |
| CaO | 8.24 |
| $K_2O$ | 0.02 |
| $Na_2O$ | 14.20 |
| $SO_3$ | 0.33 |

-continued

| Base composition | Content [% by weight] |
|---|---|
| $Al_2O_3$ | 1.0 |
| MgO | 4.50 |

The optical properties of each glass sample according to the invention, in the sheet form, were determined on a Perkin Elmer Lambda 950 spectrophotometer equipped with an integrating sphere with a diameter of 150 mm, and in particular:

- measurements in transmission were carried out (wavelength from 290 to 1750 nm). The coefficients of absorption (μ) at the wavelengths of 850, 950 and 1050 nm were calculated starting from these measurements in transmission;
- the light transmission LTD4 was also determined at a solid angle of observation of 2° (illuminant D65);
- the CIE L*a*b* parameters were determined in transmission with the following measurement parameters: illuminant D65, 10°, thickness 4 mm.

The same optical properties were also determined for comparative samples.

Set 1

Sample 1 corresponds to a glass sheet composition according to the invention. Samples 2 and 3 (comparative) correspond to glasses of the state of the art, without chromium or cobalt added (sample 2: "extra-clear" glass having a low iron content, and sample 3: "clear" glass).

The optical properties measured for samples 1-3 and also their respective amounts of iron, chromium and cobalt are presented in table I.

The curves in transmission for one and the same glass thickness between the wavelengths 290 and 1750 nm (thus including the visible and near infrared regions) of sample 1 according to the invention and of samples 2 and 3 according to the state of the art ("extra-clear" glass and "clear" glass) are represented in FIG. 1(a). An enlargement of FIG. 1(a), with the same curves in transmission but between the wavelengths 400 and 1250 nm, is represented in FIG. 1(b).

TABLE I

| | Total $Fe_2O_3$ (ppm) | $Cr_2O_3$ (ppm) | Co (ppm) | μ at 850 nm ($m^{-1}$) | μ at 950 nm ($m^{-1}$) | μ at 1050 nm ($m^{-1}$) | LTD4 (%) | Colorimetric parameters | | |
|---|---|---|---|---|---|---|---|---|---|---|
| | | | | | | | | L* | a* | b* |
| 1 | 125 | 44 | 3.5 | 0.7 | 0.9 | 1.4 | 89.3 | 95.7 | −0.9 | 0.5 |
| 2 | 92 | 0 | 0 | 2.8 | 3.2 | 3.4 | 91.6 | 96.6 | −0.1 | 0.2 |
| 3 | 1020 | 0 | 0 | 37.1 | 43.3 | 46.2 | 88.8 | 95.4 | −1.1 | 1 |

The results obtained (see FIG. 1 and table I) show that the addition of chromium and cobalt within a range of contents according to the invention (first main embodiment) in combination with a low iron content makes it possible to obtain a glass sheet which is highly transparent in the visible region, with a "neutral" color highly comparable to a clear glass of the state of the art, while significantly increasing its transmission of radiation at the wavelengths of 850, 950 and 1050 nm (thus while reducing the corresponding coefficients of absorption) in comparison with a "clear" and even "extra-clear" glass.

It should be noted that the difference in coefficient of absorption μ values between the glass of sample 1 of the invention and comparative sample 2 (extra-clear glass) is truly significant for applications using the propagation of infrared radiation in the sheared edge of the glass, the optical path length of the IR radiation then being much longer (than if it passed through the thickness through the main faces). In this case, a decrease, even small, in the absorption of the IR radiation by the glass significantly alters the effectiveness of the technology used, for example alters the sensitivity of a touch panel using a technology such as FTIR or PSD, which can then considerably decrease in the length/width of the panel.

Set 2

Sample 4 corresponds to a glass sheet composition according to the invention, blue in color. Sample 5 (comparative) corresponds to a glass of the state of the art, also blue in color, very similar in appearance to sample 4.

The optical properties measured for samples 4 and 5 and also their respective amounts of iron, chromium and cobalt are presented in table II below.

The curves in transmission for one and the same glass thickness between the wavelengths 250 and 1750 nm (thus including the visible and near infrared regions) of sample 4 according to the invention and of sample 5 according to the state of the art (blue glass) are represented in FIG. 2.

TABLE II

| | Total $Fe_2O_3$ (ppm) | $Cr_2O_3$ (ppm) | Co (ppm) | μ at 850 nm ($m^{-1}$) | μ at 950 nm ($m^{-1}$) | μ at 1050 nm ($m^{-1}$) | LTD4 (%) | Colorimetric parameters | | |
|---|---|---|---|---|---|---|---|---|---|---|
| | | | | | | | | L* | a* | b* |
| 4 | 86 | 65 | 41 | 1.3 | 1.7 | 3.3 | 78.3 | 91 | −3 | −2.9 |
| 5 | 3750 | 10 | 17 | 165.3 | 195.9 | 207.0 | 77.7 | 90.8 | −4.6 | −2.8 |

The results obtained (see FIG. 2 and table II) show that the addition of chromium and cobalt within a range of contents according to the invention (second main embodiment) in combination with a low iron content makes it possible to obtain a colored (blue) glass sheet which is highly comparable to a blue glass of the state of the art, while increasing more than significantly its transmission in the infrared region, in particular at the wavelengths of 850, 950 and 1050 nm (thus while reducing the corresponding coefficients of absorption). Furthermore, example 4 according to the invention, a colored glass sheet, exhibits coefficients of absorption in the IR region which are even lower or equal to those of an extra-clear glass of the state of the art (see example 2).

Set 3

Samples 6 and 7 correspond to compositions of glass sheets according to the invention which are very dark in color, virtually opaque for sample 6 and opaque for sample 7. Sample 8 (comparative) corresponds to a glass of the state of the art, very dark in color, very similar in appearance to sample 6.

The optical properties measured for samples 6-8 and also their respective amounts of iron, chromium and cobalt are presented in table III below.

The curves in transmission for one and the same glass thickness between the wavelengths 250 and 1750 nm (thus including the visible and near infrared regions) of samples 6 and 7 according to the invention and of sample 8 according to the state of the art are represented in FIG. 3.

TABLE III

| | Total $Fe_2O_3$ (ppm) | $Cr_2O_3$ (ppm) | Co (ppm) | μ at 850 nm $(m^{-1})$ | μ at 950 nm $(m^{-1})$ | μ at 1050 nm $(m^{-1})$ | LTD4 (%) | Colorimetric parameters | | |
|---|---|---|---|---|---|---|---|---|---|---|
| | | | | | | | | L* | a* | b* |
| 6 | 92 | 6882 | 651 | 58.2 | 52.5 | 78.8 | 3 | 19.6 | −24.7 | 27 |
| 7 | 82 | 5070 | 5169 | 66.5 | 112.0 | 321.3 | 0 | 0.1 | 0.1 | 0 |
| 8 | 32760 | 166.5 | 357 | 968.9 | 1112.4 | 1158.1 | 3 | 19.8 | −5.1 | 5 |

The results obtained (see FIG. 3 and table III) show that the addition of chromium and cobalt within a range of contents according to the invention (second main embodiment) in combination with a low iron content makes it possible to obtain a glass sheet which is extremely dark, virtually opaque, in color (LTD4=3%) and highly comparable to a glass of similar appearance of the state of the art, or a completely opaque glass sheet (LTD4=0%), while increasing more than significantly the transmission in the infrared region, in particular at the wavelengths of 850, 950 and 1050 nm (thus while reducing the corresponding coefficients of absorption), with respect to the glass of the state of the art.

The invention claimed is:

1. A glass sheet having a composition which comprises, in a content expressed as percentages by total weight of glass:

| | |
|---|---|
| $SiO_2$ | 55-85% |
| $Al_2O_3$ | 0-30% |
| $B_2O_3$ | 0-20% |
| $Na_2O$ | 0-25% |
| CaO | 0-20% |
| MgO | 0-15% |
| $K_2O$ | 0-20% |
| BaO | 0-20% |
| Total iron (expressed in the form of $Fe_2O_3$) | 0.002-0.02%; | wherein said composition comprises, by weight with respect to the total weight of the glass, a chromium content (expressed in the form of $Cr_2O_3$) ranging from 0.0015% to 1% and a cobalt content (expressed in the form of Co) ranging from 0.0001% to 1% and wherein said composition comprises a Fe2+(expressed in the form of FeO) content of less than 20 ppm.

2. The glass sheet as claimed in claim 1, wherein the composition comprises a chromium content, expressed as percentage by weight with respect to the total weight of the glass, such that: $Cr_2O_3 \leq (-17*Co)+0.0535$; Co being the cobalt content, expressed as percentage by weight with respect to the total weight of the glass.

3. The glass sheet as claimed in claim 2, wherein the composition comprises a chromium content such that: $Cr_2O_3 \leq (-17*Co)+0.0290$.

4. The glass sheet as claimed in claim 2, wherein the composition comprises a cobalt content such that: $(Cr_2O_3/25) \leq Co \leq (Cr_2O_3/5)$.

5. The glass sheet as claimed in claim 2, wherein the composition comprises a cobalt content such that: $(Cr_2O_3/20) \leq Co \leq (Cr_2O_3/10)$.

6. A device comprising a glass sheet as claimed in claim 2, wherein the device uses infrared radiation propagating essentially inside said sheet.

7. The glass sheet as claimed in claim 1, wherein the composition comprises a chromium content, expressed as percentage by weight with respect to the total weight of the glass, such that: $Cr_2O_3 > (-17*Co)+0.0535$; Co being the cobalt content, expressed as percentage by weight with respect to the total weight of the glass.

8. The glass sheet as claimed in claim 7, wherein the composition comprises a chromium content such that: $Cr_2O_3 \leq 1.5-Co$.

9. The glass sheet as claimed in claim 8, wherein the composition comprises a chromium content such that: $Cr_2O_3 \leq 1-Co$.

10. The glass sheet as claimed in claim 7, wherein the glass sheet has a light transmission LTD4 of less than 50%.

11. The glass sheet as claimed in claim 1, wherein the composition comprises a Fe2+(expressed in the form of FeO) content of less than 10 ppm.

12. The glass sheet as claimed in claim 1, wherein the glass sheet has a coefficient of absorption at the wavelength of 1050 nm of less than 5 $m^{-1}$.

13. A touchscreen or touch panel or touchpad comprising at least one glass sheet as claimed in claim 1 defining a touch surface.

14. The screen or panel or pad as claimed in claim 13, using the FTIR or PSD optical technology.

15. A device comprising a glass sheet as claimed in claim 1, in a device using infrared radiation propagating essentially inside said sheet.

16. The use as claimed in claim 15, wherein the propagation of the infrared radiation takes place by total internal reflection.

* * * * *